United States Patent [19]
Goldman et al.

[11] 3,769,963
[45] Nov. 6, 1973

[54] INSTRUMENT FOR PERFORMING LASER MICRO-SURGERY AND DIAGNOSTIC TRANSILLUMINATION OF LIVING HUMAN TISSUE

[76] Inventors: Leon Goldman, 2324 Madison Rd. 45208; R. James Rockwell, Jr., 6282 Coachlite Way 45243, both of Cincinnati, Ohio

[22] Filed: Mar. 31, 1972

[21] Appl. No.: 239,976

[52] U.S. Cl.............. 128/2 R, 128/303.1, 128/395
[51] Int. Cl............................................... A61b 5/00
[58] Field of Search............... 128/303.1, 395, 2 R; 350/35, 36, 91; 331/94.5

[56] References Cited
UNITED STATES PATENTS

| | | | |
|---|---|---|---|
| 3,703,176 | 11/1972 | Vassiliadis et al. | 128/395 |
| 3,315,680 | 4/1967 | Silbertrust et al. | 128/395 |
| 3,096,767 | 7/1963 | Gresser et al. | 128/395 |
| 3,348,547 | 10/1967 | Kavanagh | 128/395 |

*Primary Examiner*—Lawrence W. Trapp
*Attorney*—James S. Hight et al.

[57] ABSTRACT

An instrument for performing delicate surgery on man is provided with a continuous wave laser source specially associated with a binocular surgical microscope. The laser source emits electromagnetic radiation at wavelengths, preferably in the visible light range but also in the near visible infrared and ultraviolet ranges, which are absorbed selectively by different types of human tissue or tissue substructures. The source is mounted on a portable base remote from the operating area, and the radiation from the laser is communicated through a flexible fiber optic conductor to the binocular surgical operating microscope which is mounted on an articulating arm extending from the base so that the microscope may be freely positioned adjacent to the patient at the operating area. The laser beam is directed onto the tissue of the patient in a path coaxial with the viewing axis of the microscope to a point in the microscope's field of view. Controls on the microscope give the surgeon complete control of the laser beam. These include a focusing telescope for control of the laser spot size and angle of convergence of the beam, a joy stick control for moving the fiber optic tip to cause a corresponding movement in the focused laser beam on the tissue within the field of view of the microscope to allow the surgeon to precisely prescribe an incision or effect localized irradiation on that area of the patient. Transillumination of the tissues in the area of interest on the patient is possible by the direct laser beam emitted at a low-nonhazardous power level or by a second laser system which may be operated independently of the main high power surgical laser and is delivered by a hand-held sterile probe.

25 Claims, 2 Drawing Figures

PATENTED NOV 6 1973　　　　　　　　　　3,769,963

INSTRUMENT FOR PERFORMING LASER MICRO-SURGERY AND DIAGNOSTIC TRANSILLUMINATION OF LIVING HUMAN TISSUE

The present invention relates to the use of lasers in performing delicate, bloodless micro-surgery on living human tissue.

The development of the laser has prompted extensive research over the last decade into their possible uses in medicine. The ability of the laser to emit highly controllable electromagnetic radiation of high power has led many to hope that it may provide for a surgeon a powerful tool in operating on human living tissue. The unique characteristics of laser radiation which have inspired these hopes reside in the great precision which can be obtained in focusing the radiation beam for performing delicate micro-surgery and in its ability to cauterize small bleeding vessels, thus making possible bloodless surgery. Until the present time, however, no device or method has been proposed to make effective use of laser in the near-ultraviolet, visible, and near-infrared spectral regions so that a surgeon may realize its advantages in performing micro-surgery on man.

It is the principal objective of the present invention to provide a practical method and apparatus through which the advantages of lasers may be efficiently and effectively employed by a surgeon to extend his means in performing micro-surgery on man beyond those which are presently available.

The present invention provides a novel combination of features to satisfy certain considerations which are highly important to the surgeon.

One of these considerations is that the devices employed present compact operating units which will occupy a minimum amount of space in the operating area, and that such a device be capable of fast and efficient use and be capable of simple, rapid and precise control by the surgeon. Further, the device must be sufficiently portable to serve several operating rooms and be capable of being quickly brought to a patient and to the operating area so that it may provide general utility when a surgeon decides that its particular advantages as a cutting tool and coagulating are desired. Furthermore, for micro-surgery, the device must be provided with adequate viewing magnification preferably of the type giving depth perception such as standard binocular operating microscopes. Also, the safety of both the surgeon and the patient must be insured, particularly in protecting the eyes of the surgeon from the high intensity laser light. Finally, the device should allow for control of the effects of the surgical procedure on the patient to the extent that only that tissue or tissue substructure which must necessarily be irradiated in the course of the operation is involved.

Another important factor considered by the present invention is the absorption characteristic of the tissue or tissue substructure upon which the operation is to be performed. It is necessary, in order for a sufficient and controllable reaction to take place in a tissue, that the tissue effectively absorb a critical amount of the laser radiation. Thus, the absorption properties of the tissue or tissue substructure determine those radiation wavelengths and intensities which are desirable if micro-surgery is to be possible. Some radiation of present laser devices, for example, in the far infrared spectrum (10,000 nanometers), is readily and uniformly absorbable by almost all living human tissue and tissue substructures. But as an additional consideration, it is highly preferable that the particular part of the tissue or tissue substructure desired to be effected in the surgical procedure, and only that part, absorb the radiation.

To achieve this result, the present invention incorporates a continuous wave or high pulse rate frequency (prf) laser source which emits electromagnetic radiation in the visible or near visible spectral ranges. It has been found that radiation having a wavelength in this range is more readily absorbed by some types of tissue and tissue substructures than others. By selecting the proper radiation wavelength for the particular operation to be performed, the surgeon may very precisely restrict the primary effects of the irradiation to only the tissue or tissue substructures of interest, thus, minimizing the extent of damage to surrounding and underlying tissue. Also, it is possible to some degree to cause effects in some tissue substructures (blood vessels, pigmented tumors, etc.) which are part of a given tissue layer if the absorption of these substructures is considerably above that of the layer through which surgery is to be performed. In the visible light spectral range, the selective absorption effect can sometimes be enhanced by the technique of staining the tissues with various vital dyes. This involves the injection, ingestion, or surface painting of a substance into or on a patient which substance will collect in certain types of tissue and render them more capable of absorbing certain wavelengths of radiation. This is quite often possible where cancerous tissue is involved.

It has been shown that selective absorption processes occur in human tissue with radiation in an approximate wavelength range from 200 or 300 nanometers to something in excess of 2,000 nanometers, or from the near ultraviolet spectral region to the near infrared spectral region. A detailed discussion of the selective absorption properties of living tissue are discussed at length in the book entitled *Lasers In Medicine* by Leon Goldman, M. D., and R. James Rockwell, Jr., Gordon and Breach Science Publishers, Inc., N.Y., 1971, and particularly, in Chapter VII therein. A choice of selectively absorbable wavelengths of energy makes it possible for the surgeon to cause effects only on the precise tissue or tissue substructure of interest, and thus to avoid doing unwanted damage to surrounding tissue which is less absorbant to that particular frequency.

To further achieve the consideration set forth above, the present invention provides for the completely flexible communication of a high power laser beam from a remote but portable source to a compact surgical operating microscope mounted so as to be freely positionable to the operating area. Means are provided for causing the beam to be projected toward the patient from the microscope in a path coaxial with the viewing optics of the microscope. This allows the laser beam to be automatically directed on the tissue upon which the operation is to be performed and to remain in the viewing field of the microscope as the surgeon positions the microscope optics to view the surgical area. In this way the surgeon need perform only the initial operation of positioning the microscope which will be an operation with which the surgeon will be generally familiar. Once the microscope is focused and in place, the surgeon is able to precisely control the size, focus and location of the laser spot on the tissue by controls conveniently positioned on the microscope. For this purpose, the device of the present invention is provided with a small, compact focusing telescope mounted on the microscope and through which the laser beam is directed. This telescope is provided with a focusing control readily accessible to the surgeon so that he may control the size and convergence or divergence of the spot on the patient by focusing the laser beam.

The initial positioning of the laser beam may be obtained by operating the laser source at a low power level so as to direct this beam on the tissue for purposes of safely viewing. This low irradiance power level will be bright enough for the surgeon to see but not sufficiently intense to cause a reaction of the tissue. Alternatively, and according to one aspect of the present invention, the aiming of the spot may be accomplished through use of one or more of the low power level emissions of a laser at frequencies which are not the principal emissions of the laser emissions where one such low level emission of sufficient intensity to be rendered visible exists. To do this, a filter may be employed to block the main band of energy from the laser. A separate low power laser of a different frequency in the visible spectrum may also be used. The initial aiming of the spot visually is made possible by employing a laser frequency which is in the visible spectral range.

Once the spot has been initially focused and positioned at the proper point within the field of view of the microscope, the surgeon can energize the high intensity laser and move the spot to prescribe an incision on the patient. The spot is so moved by a joy stick control mounted on the microscope which moves the tip of the fiber optic in relation to the objective lens of the telescope.

Also, provided are an external exposure control of the average laser power and a separate exposure control of the exposure time.

The arrangement of the device of the present invention effectively provides the surgeon with complete safety from the laser radiation and particularly from the danger to his eyes while viewing the operating area. This is accomplished by a special filter in the viewing microscope which reduces the transmitted radiation at the principal frequency or frequencies of the surgical laser to non-hazardous levels.

Furthermore, the compact device of the present invention provides a minimum number of controls which must be handled by the surgeon during the operation, and thus provides a device which can be easily sterilized to maintain the required operating room environment. The bulk of the electronic portion of the laser device is maintained at sufficient distance from the operating area to prevent contamination of the operating area, and is set upon a sufficiently portable base so that the device can be moved from operating room to operating room providing enhanced utility as an operating tool for a surgeon.

Additionally, it is contemplated that visible laser radiation may be used as a diagnostic aid to the surgeon. This is done by transillumination of the tissue by passing a laser beam of the proper visible wavelength therethrough. This will allow the surgeon to locate and delineate subsurface growths or other types of tissue abnormalities. The selective absorption features discussed above in connection with the surgical use of the laser may greatly enhance the effectiveness of this feature. This procedure may be effected by use of the low power emission from the surgical laser or, ultimately, from a second laser of independent control and independent frequency.

None of the prior art devices which have been thus far proposed incorporating lasers for use in medicine have been effective to provide the features set forth above. A discussion of these prior art devices may be found in the book, *Lasers In Medicine* cited above and in the publications cited in the extensive bibliographies contained therein.

The prior art uses of lasers in connection with clinical medicine generally fall into three classes: ophthalmology, dermatology, and experimental surgery. These areas and the equipment used therein are discussed briefly in an article entitled "Designs and Functions Of Laser Systems For Biomedical Applications," by R. James Rockwell, Jr., Annals Of The New York Academy Of Sciences, Volume 168, Article 3, Pages 459–471, Feb. 10, 1970.

The ophthalmological uses involve perhaps the most extensive, practical medical application of lasers to date. In this field, lasers are used for operations on the retina of the eye. The most frequent uses are the attaching detached retinas through laser photocoagulation to form lesions of scar tissue, and the sealing of blood vessels and destroying proliferative vascular growths in retinal diseases such as diabetic retinopathy. In these applications, a laser beam is focused on the retina and, by short exposures of radiation, produce a pinpoint thermal coagulation lesion on the retina or retinal substructure. Typical devices for use in such operations are disclosed in U. S. Pat. of Gresser No. 3,096,767, Silbertrust et al. No. 3,315,680, and Kavanagh No. 3,348,547, and in the article by F. A. l'Esperance, Jr., E. F. Labuda, and A. M. Johnson, "Photocoagulation Delivery Systems For Continuous-wave Lasers," British Journal of Ophthamology, Vol. 53, No. 5, pages 310–322, May, 1969.

Most of these devices employ a laser, either a pulsed ruby laser or an argon-ion laser, in combination with either a monocular indirect afocal viewing telescope or slit lamp binocular microscope which allows the eye surgeon to view the operation which he is performing. These devices would not be effective in performing micro-surgical techniques under standard operating room procedures and are generally incapable of performing knife-like incisions in micro-surgery. Generally, these devices operate to cause a very minimal thermal reaction in the retinal tissues at a single spot of 50 to 300 micron size. Accordingly, the devices which have been developed for this use are relatively inflexible and too cumbersome for use in an operating room. Most of these devices are large and stationary and require that the patient be positioned relative to the laser equipment. Some of these devices, while having some portability, have a laser generator inflexibly associated with the viewing optics, thus requiring it to be moved in bulk to the patient. These cannot be easily positioned in a surgical area and are provided with no means by which a scan of the beam across the tissue can be achieved to make knife-like incisions. Other devices, which provide portable optical units remote from the laser generator, doe not provide means for positioning the viewing optics and then moving the beam within the field of the optics to prescribe a delicate incision. Thus, these devices would fail to satisfy many of those considerations discussed above with relation to the requirements of a practical laser in micro-surgical application on man. Specifically, these devices could not be positioned for quick efficient use by a surgeon in a general operating room. They do not present a device which can be employed quickly and efficiently so that a surgeon may view a surgical area and fixed into position relative to the area and then allow a laser beam to be precisely and accurately manipulated within the area while viewing so as to perform knife-like incisions. Furthermore, the absence of the laser frequencies which are selectively absorbed in tissues or tissue substructures would further fail to satisfy another important consideration for practical surgical use.

In the field of dermatology, laser devices have been used to remove foreign pigments from the skin such as tattoos and to treat certain vascular disorders (angiomas, etc.) and remove various pigmented skin lesions and tumors such as melanoma. These laser devices have employed visible light for this purpose. The requirement for flexible delivery of the laser energy has generally involved movement of the entire laser source with respect to the area of skin to be treated. Normally, dermatologic treatments have employed pulsed lasers, although continuous wave lasers have been used to some limited extent. For most dermatologic applications, the laser beam is usually directed over a relatively large area of skin of from two to three square centimeters. These applications usually do not require surgical use wherein fine knife-like incisions are made in living tissue.

With respect to the experimental gross surgical applications, high-powered (50–300 watt) continuous wave lasers have been used for massive surgical cutting procedures. Typically, these lasers have been focused onto tissues with spot sizes of approximately one millimeter diameter and caused to move relative thereto at a uniform speed across the surface thereof to produce a continuous cut. For this purpose, infrared frequency lasers, such as the $CO_2$ laser, have been used. These lasers emit in the far infrared spectral region at a 10,600 nanometer wavelength. Such radiation is not selectively absorbed by human tissues or tissue substructures, but is strongly and uniformly absorbed by all components of living tissue so that selective cutting of the tissue is not possible. A further disadvantage of such radiation has been that it requires special infrared lenses, normal optical glass being opaque to radiation of this wavelength. Furthermore, since the focal spot is invisible, only the resulting tissue reaction can be seen by the surgeon making it more difficult to precisely direct the beam. Attempts have not been made prior to the present invention to incorporate this type of surgical device into an optical viewing system such as the binocular microscope employed by the present invention and thus, no prior proposal has been made to provide suitable means to manipulate the operating laser beam with respect to the field of vision of such optical system and to overcome the delicate control problems involved in performing surgery on man.

None of these prior art devices is capable of producing satisfactory results in a practical and highly flexible instrument which can be efficiently used by a surgeon for micro-surgery on living human tissue or tissue substructures, and particularly, none provides means for generating high power continuous wave or high pulse rate frequency laser energy which can be selectively absorbed in tissues or tissue substructure and directing it in a beam in a precise manner on living tissues within the field of view of an operating microscope so that the laser may be used as a knife or perform other surgical procedures.

Also with the present invention, delicate control of the instrument makes it possible for the first time to use a surgical microscope for illumination and recognition of early pre-invasive cancer, and particularly, in the case of cancer of the cervix, and also, for the precise laser treatment of the actual areas of pre-invasive cancer. The present invention will thus provide an adjunct in the cancer control program where the PAP or cytological smears are performed, to find the precise source of the pathological PAP smear.

These objects and advantages of the present invention discussed above and others will be more readily apparant from the following detailed description of the drawings illustrating the apparatus embodying principals of the present invention, and setting forth the method of the present invention in connection with the discussion of the use and operation of the apparatus illustrated and described.

Figure 1:
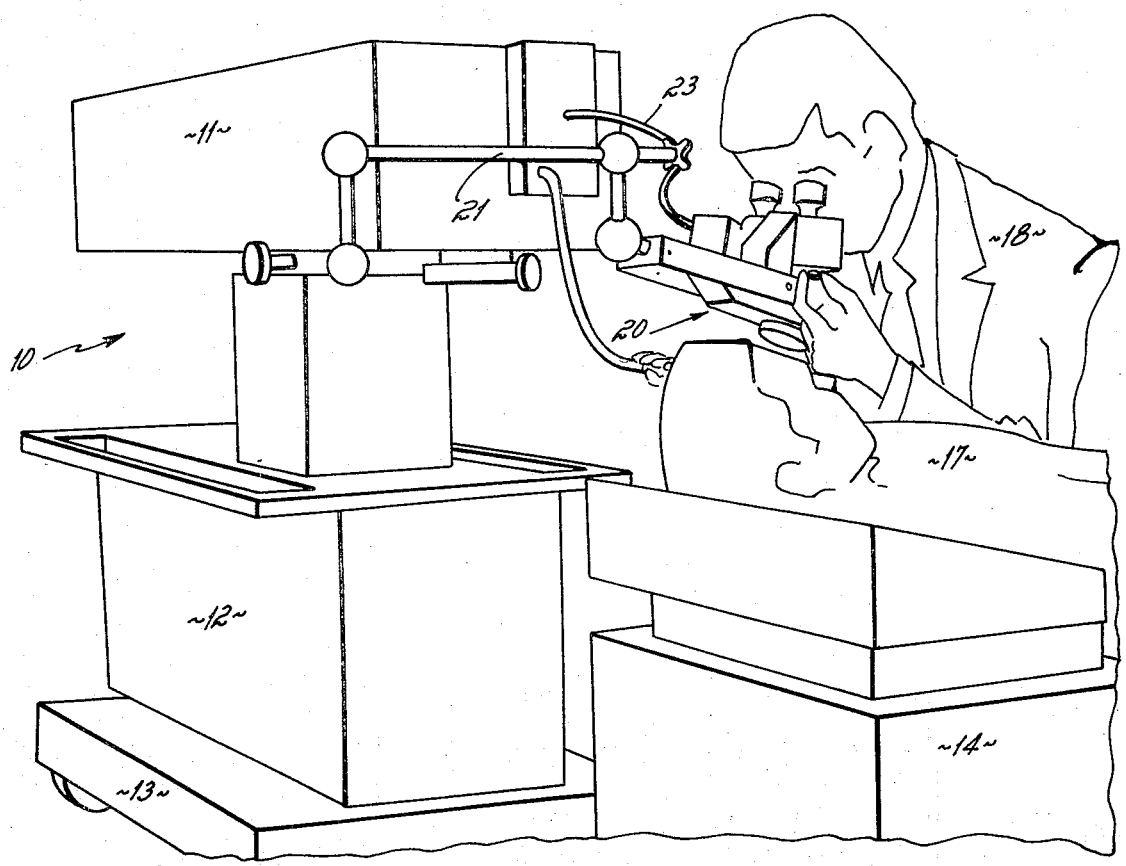
FIG. 1 is a perspective view of a surgical laser embodying principals of the present invention.

Referring to FIG. 1, there is illustrated a laser device 10 of self-contained design specifically intended for use in precision surgery with magnifying optics. This device 10 is designed for efficient and convenient use by a surgeon in performing surgery on man. The device 10 includes a laser generator unit 11 which contains the laser source. This device 11 is illustrated in one preferred form mounted on a portable floor standing unit 12 having a wheeled base 13, but this unit may also be mounted in or hanging from the ceiling above the operating area or in the base of the operating table 15. A conventional surgical binocular operating microscope 20 of the type commonly used in delicate microsurgery is provided. The microscope 20, through the motion of the articulating arm 21, can be moved by the surgeon 18 to any position in close proximity to the patient 17 upon the table 14 and in such position the microscope can remain during the course of the operation or until further moved by the surgeon 18. The laser beam from the laser unit 11 is communicated through a flexible fiber optic 23 into a path coaxial with the viewing axis of the microscope 20. The optical arrangement of the components can better be understood by reference to the diagrams of FIG. 2.

Figure 2:
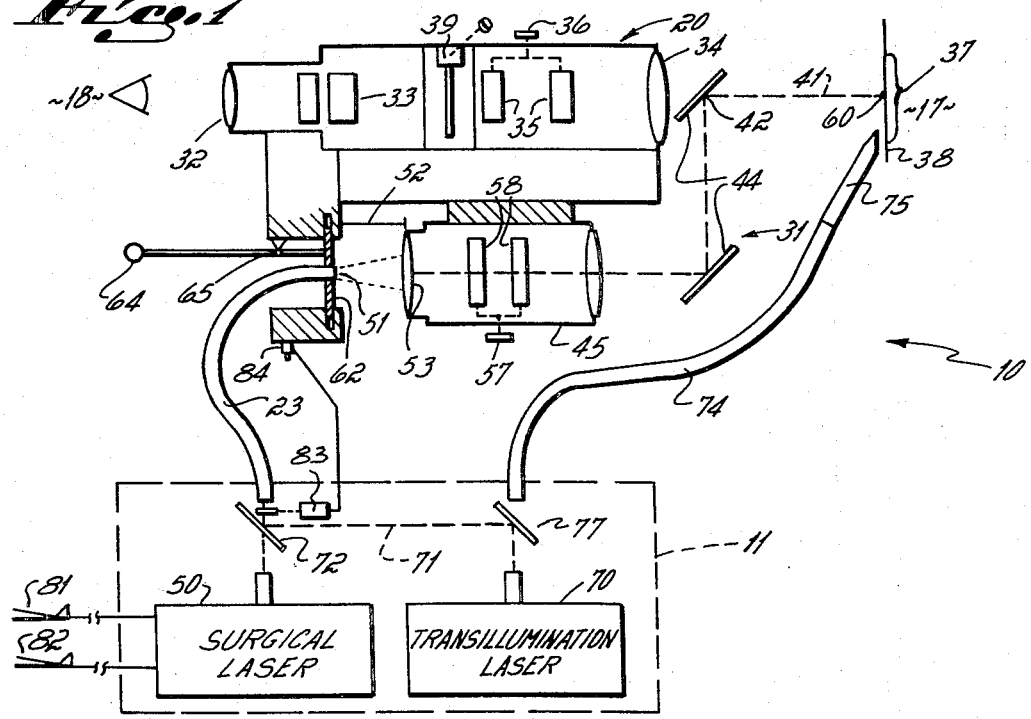
FIG. 2 is an elevational diagram of the device of FIG. 1.

Referring to FIG. 2, a cross-sectional diagram of a conventional operating microscope 20 is illustrated having associated therewith a laser beam communicating device 31. The microscope 20 is a conventional microscope including a pair of eyepieces 32, internal optics 33 for directing light from an objective lens 34 or pair of objective lenses, toward the eyepieces 32, and internal focusing elements 35 which can be operated so as to focus the microscope through the operation of a focusing control knob illustrated diagrammatically at 36. When focused, the microscope will present a magnified field to the surgeon 18 of an area 37 of the tissue 38 of the patient 17. A filter shutter 39 is connected into the microscope 20 to be moved into the optical path upon the operation of the surgical laser at high operating power to protect the eyes of the surgeon.

The laser beam path 41 is illustrated as emanating from a point 42 near the center of the objective lens 34 and coaxial with the optical path of the objective lens 34. This path 41 will direct the beam onto a spot on the area 36 within the viewing optical field of the objective 34. The laser beam directing device 31 includes a pair of dichroic filters or mirrors 44, a focusing telescope 45, the fiber optic rod 23, all connected in a series from a laser source 50 contained within the unit 11. The source 50 emits coherent light along the fiber optic conductor 23 to a point 51 which falls within the focal length 52 of an objective lens 53 of the focusing telescope 45 which serves to collimate the beam exiting the fiber optic 23. The beam passing through the telescope 45 is directed by the mirrors 44 along the path 41. The laser beam can be focused by adjusting the control 57 of the telescope 45 which controls the focusing optics 58 of the telescope 45. This adjustment causes a change in the convergence of the laser beam and thereby regulates the size of the spot impinging upon a point 60 of the area 37 at the focal plane of the microscope 20. In this manner, the surgeon can control the diameter of the operating beam from the laser which he is using for surgery and thus minimize the amount of tissue destroyed by the incision. The beam diameter which is most effective for most micro-surgical purposes of this type is roughly in the range from 30 to 1000 microns in diameter.

The point 51 is defined by the end of the fiber optic 23. This end is mounted by suitable mounts 62 such as a slidable plate or block, so that it can move in a plane perpendicular to the axis of the telescope objective lens 53. This movable mounting 62 allows the point 51 to be moved through the control of a control lever 64 which is attached at a univeral pivot point 65 to the structural case of the microscope 20. By motion of the control 64, the laser beam source is moved in the focal plane of the objective lens 53 so as to cause a movement of the spot 60 on the area 37. This allows the surgeon to control the point of impingence of the beam and to thus prescribe the path of the beam on the tissue to define the incision which is being made by the laser beam. This is done while the microscope 20 remains focused and in place.

The fiber optic 23 may only be made from certain high efficiency fibers. One type now available is a special tapered fiber described in a recently published West German patent application in the name of Gunther Nath. Another suitable type of fiber is that manufactured by Nipon Electric of Japan and sold under the name Selfoc. It is also of quartz and is believed to have a parabolic index of refraction across its cross-section to serve as a waveguide and conserve beam coherence.

The laser source 50 may be any one of a number of conventionally known laser sources, and it is anticipated that many other suitable sources will be developed in the near future which are effective for this purpose. The source may be of the type designed to generate energy at a discrete frequency or, and perferably, a tunable source so that selective absorption may be best realized. This laser source generates essentially continuous wave laser energy which will emit a beam having a wavelength of visible or near visible light. Various laser sources and the wavelengths of radiation that they emit are listed in the tables on pages 62–64 of *Lasers In Medicine* cited above. Of these sources, those classified as "quarsi-CW" lasers emit pulses of high pulse rate frequency which may be essentially continuous wave energy for the purposes of the present invention. Not all of those sources listed are presently available in devices which generate sufficient power for surgical use. In order to obtain selective absorption of the energy by tissue, this light should be in the range from 200 to 3,000 nanometers in wavelength. It has been found that selective absorption does occur with wavelengths in this range and especially with wavelengths from 300 to 1,000 nanometers. Selective absorption occurs throughout the visible range of 400 to 700 nanometers and into the near infrared range where it is very pronounced at 1,000 nanometers where minimum absorption occurs in unpigmented tissues. This 1,000 nanometers may be ideally suited for some uses. Selective absorption is also significant at 2,200 nanometers. However, in the far infrared range of approximately 10,000 nanometers, no selectivity is achieved in that all tissue tends to uniformly absorb radiation of this wavelength. This data is discussed in the text relating to table 7-1 and FIG. 7-2 on pages 168 and 169 respectively of *Lasers In Medicine* cited above.

A suitable laser source 50 for micro-surgical uses should be capable of emissions in the range of from approximately 0.5 to 10 watts, average power. In order that cutting may be effected, this must be focused to an irradiance ranging from 0.1 to something in the order of 50 kilowatts per square centimeters.

Remote controls for the laser source 50 are provided at the operating area. These include an average power level control and an exposure time control in the form of foot pedals 81 and 82 respectively.

Aiming of the laser can be achieved by a low level secondary emission from the laser 50 (as discussed above) for which is provided a filter 83 selectively controllable by a switch 84 positioned on the microscope 20. Alternatively, an independent laser white light source may be used connected into the system in the manner of the laser source 70 of FIG. 2.

For purposes of transillumination of the tissue to aid the surgeon in locating the precise area at which the surgery is to be made, a separate laser generator is preferably provided. This is illustrated in FIG. 2 as the generator 70 which is also contained in the laser unit 11. This laser 70 is generally of a lower intensity than that used for the surgical laser source 50. It is possible, however, that a single laser source be used for both surgery and transillumination and that it be operated for transillumination at either a lower intensity or in a manner which will more widely distribute the beam so as to provide an irradiance which provides a satisfactory visual effect but which does not cause tissue injury. This may be done through focusing of the telescope 45. When the separate transillumination laser source 70 is used, and a separate laser source is generally prefered, the emission from the source 70 may be utilized in one of two ways. In one way, the beam may be communicated through the optics provided for the surgical laser source 50 by directing the beam along a path 71 and into the fiber optic 23 through the use of a dichroic filter 72. Alternatively, the beam from the source 70 may be directed along a separate path through a separate fiber optic 74 to a probe 75 which may be separately held by the surgeon. Both paths may be selectively incorporated into a single unit by incorporation of a fifty percent reflective mirror 77, or a moveable mirror, or a polarization sensitive optical switch such as a Pockells cell. This cell would operate to allow the beam to pass directly through it under normal conditions to the fiber 74, or it can operate as a dichroic mirror to direct the beam along the path 71 when a specific electrical potential is applied to the cell.

The book *Lasers In Medicine* cited above and particularly the specific sections referred to in the specification above are expressly incorporated by reference into this application.

Through the use of the apparatus described above, the unique micro-surgical procedure which the present invention has sought to provide is achieved. Through this method, the unique characteristics of the laser can now be used in performing delicate bloodless micro-surgery on man.

In performing such surgery, the surgeon utilizes his surgical microscope 20 to magnify the area of tissue of the patient on which a micro-surgical operation is to be performed. He does so by positioning the microscope, which is freely moveable through its articulating arm mounts 21 adjacent the surgical area. Through a focusing control 36 on the microscope, the surgeon focuses the microscope on the tissue to present to him a field of view which includes the tissues or tissue substructures upon which the desired surgery is to be performed.

The surgeon then may employ the diagnostic functions of the device to locate and evaluate the surgical area. To do so he engages the transillumination laser source 70, preferably controlled through a switch conviently positioned, for example, on the probe 75, and directs the probe 75 toward the patient causing the transilluminating radiation to pass through and illuminate the tissue and substructure. The transilluminating radiation may be visible or near visible and rendered visible through the use of special materials in the optics of the microscope or through a substance such as a fluorescent stain applied to the tissue. The selective absorption of the radiation will enhance the contrast within the tissue and substructure parts. Through the use of a tunable laser, whether continuous or discrete frequency type, the surgeon may also obtain information regarding the relative absorption properties of the tissue and substructures by changing the frequency and observing the changes in contrast among the tissues and substructures. Normally, the surgeon will select his surgical frequency from his previous experiences and clinical data previously acquired.

Once the area is located and the proper frequency selected, the surgeon focuses and aims the surgical laser. He does so either by directing a separate aiming light source through the telescope 45 or by operating the laser source 50 at low power or by the use of one of the secondary emissions of the source 50 with the principal emission blocked by the filter 83. Focusing is achieved by adjustment of the knob 57 on the telescope 45 to control the laser beam conveyance and the spot size on the tissue. By operation of the lever 64, the fiber optic 23 is moved to cause a corresponding movement of the spot on the tissue to position the spot to the point where the surgical operation is to begin. The surgical laser beam, as well as the aiming radiation is transmitted into a path coaxial with the axis of the viewing optics to allow precise positioning of the spot. This is done with the microscope 20 stationary presenting a fixed viewing field. At this time the surgeon activates the filter 39 in the microscope to shield his eyes from the intense radiation.

The surgeon then sets the exposer time control through foot pedal 82, and the power level control through foot pedal 81. He then energizes the source 50 to high surgical power level or, depending on the embodiment of the device used, may deactivate the filter 83 through switch 84 on the microscope. The surgical power then begins and lasts until the preset exposure time lapses or until he manually terminates the laser emission.

To perform micro-surgery involving delicate knife-like incisions, the surgeon moves the spot on the tissue through the lever 64 while the surgical laser 50 is energized and while his microscope 20 is fixed on the viewing field. The lever 64, presents a high mechanical advantage particularly with the specific relationship of the moveable fiber optic tip 51 to the telescope objective lens 53. This allows very precise and delicate movement of the cutting beam of a degree heretofore unrealized in micro-surgery.

From the above discussion of the invention it will be apparent that not only is a unique method and apparatus presented which will provide a new and powerful tool for the surgeon in performing delicate bloodless microsurgery, but also that it provides a means by which the advantages of the laser may provide for future further extension of the art of surgery on man.

What is claimed is:

1. A surgical instrument for making knife-like incisions on living human tissue or tissue substructures comprising:
   a base positioned remote from an operating area;
   a laser source mounted at said base;
   said laser source being operable to emit essentially continuous wave electromagnetic radiation having a wavelength within a spectral range including near ultraviolet visible and near infrared radiation;
   a binocular microscope;
   means for mounting said microscope for free movement adjacent said operating area;
   laser beam focusing optics mounted on said microscope;
   a flexible fiber optic conductor connected between said source and said focusing optics to transmit the output of said source to said focusing optics;
   means for communicating said laser beam from said focusing optics along a path coaxial with the viewing axis of said microscope toward a patient at said operating area; and
   controls positioned at the operating area for operation by a surgeon while viewing through said microscope, said controls including
   a. a first control for focusing said microscope on a portion of tissue of a patient at said operating area,
   b. a second control for focusing said focusing optics to control the size of the spot formed by said laser beam on said tissue, and
   c. a third control for moving said spot on said tissue in the field of view of said microscope.

2. The instrument of claim 1 wherein:
the spectral range of said laser emission includes only the visible range.

3. The instrument of claim 1 wherein:
said radiation has a wavelength within the spectral range of from 200 to 3,000 nanometers.

4. The instrument of claim 3 wherein:
said radiation has a wavelength within the spectral range of from 300 to 1,000 nanometers.

5. The instrument of claim 4 wherein:
said radiation has a wavelength within the spectral range of from 400 to 700 nanometers.

6. The instrument of claim 1 wherein:
said third control includes means on said microscope for moving the exit end of said fiber optic conductor in a plane which intersects the axis of said laser beam focusing optics.

7. The instrument of claim 6 wherein:
said third control includes a lever mounted on said microscope for moving said end of said fiber optic conductor.

8. The instrument of claim 1 wherein:
said laser source is operable to emit relatively low power level secondary emissions in the visible spectral range; and
said instrument further includes filter means for selectively blocking the primary emission from said source;
whereby said laser is capable of being aimed by said low power emission without causing a reaction on said tissue.

9. The instrument of claim 1 wherein:
said microscope mounting means includes an articulating arm connected to said base.

10. The instrument of claim 1 wherein:
said base is a portable wheeled floor standing base.

11. The instrument of claim 1 further comprising:
means for generating electromagnetic radiation for diagnostic transillumination including a laser source operable to emit electromagnetic radiation within a spectral range including visible radiation and radiation within the near ultraviolet and near infrared spectral ranges which can be rendered visible; and
means for directing said transilluminating radiation onto and through said tissue or tissue substructures for transillumination thereof.

12. The instrument of claim 11 wherein;
said transilluminating laser source includes a second laser source distinct from said first recited laser source.

13. The instrument of claim 11 further comprising:
means for communicating said transilluminating radiation through said focusing optics.

14. The instrument of claim 11 further comprising:
means, including a light probe, and a second fiber optic conductor distinct from said first recited fiber optic conductor for directing said visible light onto said tissue.

15. The instrument of claim 14 wherein:
said transilluminating laser source includes a second laser source distinct from said first recited laser source; and
said instrument further comprises means for communicating said transilluminating radiation through said focusing optics and means for alternatively directing said light from said second source through said second fiber optic conductor and said probe.

16. The instrument of claim 1 wherein:
said controls are mounted on said microscope.

17. The instrument of claim 1 where said controls further include:
a fourth control for regulating the power from said laser source; and
a fifth control for regulating the exposure time of said laser.

18. The instrument of claim 17 wherein:
said fourth and fifth controls are floor mount foot actuatable controls.

19. A surgical instrument for performing microsurgery on living human tissue or tissue substructure comprising:
a laser source mounted remote from an operating area;
said laser source being operable to emit essentially continuous wave electromagnetic radiation having a wavelength within a spectral range in which it is differently absorbed by different tissue or tissue substructure;
a surgical microscope;
means for mounting said microscope for free movement adjacent said operating area;
laser beam focusing optics mounted on said microscope;
a conductor of said radiation connected between said source and said focusing optics to transmit the output of said source to said focusing optics;
means for communicating said laser beam from said focusing optics toward a patient at said operating area; and
controls mounted on said microscope including
a. a first control for focusing said microscope on a portion of tissue of a patient at said operating area,
b. a second control for focusing said focusing optics to control the size of the spot formed by said laser beam on said tissue, and
c. a third control for moving said spot on said tissue in the field of view of said microscope.

20. A laser instrument comprising:
a laser operable to generate a beam of electromagnetic radiation at its output;
a focusing telescope for controlling the coherence of said beam, said telescope having an objective lens;
a flexible fiber optic conductor extending from said laser output to said telescope to transmit said beam from said laser to said telescope;
the exit end of said conductor being mounted for movement in a plane intersecting the optical axis of said telescope and within the focus of said objective lens; and
a control for moving said exit end in said plane.

21. The instrument of claim 20 wherein:
said control includes a universally pivoted lever.

22. A method of aiming and operating a laser instrument which comprises:
a. a laser operable to generate a beam of electromagnetic radiation at its output, said radiation including a principal emission at a first frequency and at least one secondary emission at a second frequency different from said first frequency, the power level of said principal emission being sufficient to cause a given effect on a target when directed thereon, and the power level of said secondary emission being insufficient to cause said effect but being capable of being rendered visible where directed upon said target
b. means for controllably directing said beam from said laser output to said target, and c. a selectively actuable filter for blocking said principal emission, said filter being positioned between said laser output and said target, said method comprising the steps of:

operating said laser and actuating said filter to generate a beam toward said target containing said secondary emission but absent said principal emission; and, concurrent therewith, controlling said directing means to direct said beam onto a desired spot on said target; then deactuating said filter and operating said laser to generate a beam toward said target containing said principal emission to cause said given effect on said target.

23. A method of performing micro-surgery on living human tissues or tissue substructures comprising the steps of:

viewing under magnification and along a given viewing axis an area on a patient which includes the tissue or tissue substructure upon which micro-surgery is desired;

generating a laser beam of electromagnetic radiation at a selected frequency which is highly absorbed by said desired tissue of substructure and which is less highly absorbed by adjacent tissue, said frequency being within a spectral range including near ultraviolet, visible, and near infrared radiation;

directing said laser beam onto said area;

focusing said beam to a given spot size on said area;

while maintaining said viewing area fixed, moving said beam to a selected point on said desired tissue; and then generating said laser beam at a power level sufficient to cause reaction in said desired tissue or tissue substructure.

24. The method of claim 24 further comprising the steps of:

generating a transilluminating laser beam of electromagnetic radiation within the spectral range of near ultraviolet, visible, and near infrared radiation and at a power density insufficient to cause reaction on said tissue or tissue substructure; and passing said transilluminating laser beam through tissue at said viewed area to locate said desired tissue.

25. The method of claim 25 further comprising the step of:

varying the frequency of said transilluminating laser while observing the contrast of the area under magnification to determine said selected frequency.

* * * * *

UNITED STATES PATENT OFFICE
CERTIFICATE OF CORRECTION

Patent No. 3,769,963    Dated November 6, 1973

Inventor(s) Leon Goldman and R. James Rockwell, Jr.

It is certified that error appears in the above-identified patent and that said Letters Patent are hereby corrected as shown below:

Column 4, line 64, "doe" should be -- do --

Column 7, line 35, "univeral" should be -- universal --

Column 14, line 11, second "24" should be -- 23 --

Column 14, line 20, second "25" should be -- 24 --

Signed and sealed this 19th day of March 1974.

(SEAL)
Attest:

EDWARD M. FLETCHER, JR.
Attesting Officer

C. MARSHALL DANN
Commissioner of Patents